United States Patent Office 3,293,270
Patented Dec. 20, 1966

3,293,270
1 - AMINO - 4 - HYDROXY - 2 - (ALKYLTHIO- AND HYDROXYALKYLTHIOPHENOXY) - ANTHRAQUINONES
Volker Hederich, Cologne-Deutz, Gunter Gehrke, Cologne-Flittard, and Karlfried Wedemeyer, Cologne-Stammheim, Germany, assignors to Farbenfabriken Bayer Aktiengesellschaft, Leverkusen, Germany, a corporation of Germany
No Drawing. Continuation of application Ser. No. 245,419, Dec. 18, 1962. This application Sept. 27, 1965, Ser. No. 490,678
Claims priority, application Germany, Dec. 23, 1961, F 35,650
8 Claims. (Cl. 260—380)

The present case is a continuation of Serial No. 245,419, filed on December 18, 1962, and now abandoned.

This case relates to new anthraquinone dyestuffs.

It has been found that valuable anthraquinone dyestuffs for synthetic fibers are obtained by reacting 1-amino-2-halo-4-hydroxy-anthraquinone with optionally substituted alkylmercapto phenols.

The dyestuffs obtained according to the invention may be represented by the following formula:

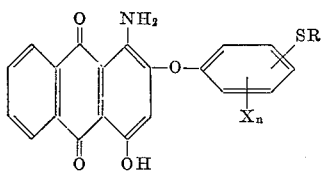

wherein R stands for an alkyl or hydroxy alkyl radical, X means alkyl, alkoxy or hydroxy alkoxy radicals and $n$ represents a whole number from 0 to 3.

The alkylmercapto phenols can contain as alkyl radicals preferably lower alkyl radicals, for example with up to 6 carbon atoms, and which may also contain hydroxy groups. The alkylmercapto phenols may also contain in the aromatic part further substituents, such as for example alkyl groups, preferably alkyl groups with up to 4 carbon atoms, alkoxy or hydroxy alkoxy groups, the alkyl groups being again preferably lower alkyl groups. Examples of such compounds are as follows: 2- or 3- or 4-methyl mercaptophenol, 2- or 3- or 4-ethylmercapto phenol, 2- or 3- or 4-(2'-hydroxy ethyl-mercapto)-phenol, 4-methyl mercapto-3-methyl phenol, 4-methylmercapto-3,5-dimethyl phenol, or 4-methylmercapto-2-methoxy phenol.

The reaction of the 1-amino-2-halo-4-hydroxy-anthraquinones, preferably of the technically obtainable 1-amino-2-bromo- or -chloro-4-hydroxy-anthraquinone, with the alkyl mercapto phenols is carried out in a manner known as such in the presence of strongly alkaline compounds, such as for example potassium or sodium hydroxide or carbonate. The reaction is advantageously carried out in an excess of the alkyl mercapto phenol at temperatures from 100–180° C.

The new dyestuffs can chiefly be used as dispersion dyestuffs for synthetic fibers, preferably of linear polyesters. They can be dyed according to the methods usual for these fibers, for example at 110–130° C. under pressure or at boiling temperature in the presence of so-called carriers, for example chloro benzene, 2- or 4-hydroxy diphenyl, salicyclic acid or -methyl esters. The new dyestuffs can also be applied in mixtures with one another and are with advantage, finely dispersed by the usual methods in the presence of dispersing agents, if desired.

On linear polyester fibers the new dyestuffs produce red dyeings with very good fastness properties, especially good resistance to dry heat treatment such as resistance to sublimation and thermofixation.

The following examples are given for the purpose of illustrating the invention. The parts given are parts by weight.

Example 1

100 parts of technical 4-methylmercapto-3-methyl phenol are heated to 100° C. with 10 parts of anhydrous potassium carbonate, 20 parts of 1-amino-2-bromo-4-hydroxy-anthraquinone are introduced into the melt whilst stirring, and the mixture is heated at 150° C. six hours. After termiantion of the reaction, the reaction mixture is cooled to 80° C. and diluted with 100 parts of methanol. The precipitated red dyestuff is filtered off with suction, washed with hot water and dried at 90° C.

The yield of crude product is nearly quantitative. From chlorobenzene the dyestuff crystallises as red needles of melting point 225–227° C.

1 part of this dyestuff which has previously been finely divided in the presence of dispersing agents is dispersed in 3000 parts of water. In the dyebath thus obtained 100 parts of polyester fabric, for example polyethylene glycol terephthalate, are dyed at 130° C. for one hour. A brilliant red dyeing is obtained of very good fastness to light and excellent fastness to sublimation.

Example 2

Into a melt of 50 parts of 4-methylmercapto-phenol and 10 parts anhydrous potassium carbonate, 20 parts of 1-amino-2-bromo-4-hydroxy-anthraquinone are introduced. After heating at 140–150° C. for 4–5 hours the reaction is completed. The reaction mixture, cooled to 80–90° C., is diluted with 50 parts of methanol. After suction-filtration, washing with methanol and hot water the resultant dyestuff is dried at 90° C. 20.2 parts of crude product are obtained which crystallises from chlorotoluene in the form of red darts. The melting point is 170° C.

With 1 part of this dyestuff in a finely dispersed form 100 parts of polyester fibers, for example polyethylene glycol terephthalate, are dyed for 120 minutes at boiling temperature in 4000 parts of water in the presence of 15 parts of o-cresotic acid methylester as carrier. A clear red dyeing of very good fastness to light and subliming is obtained.

Example 3

12 parts of 1-amino-2-bromo-4-hydroxy-anthraquinone are introduced into a melt at 120° C. consisting of 70 parts of 4-methylmercapto-3,5-dimethyl-phenol and 6 parts of anhydrous potassium carbonate. The reaction mixture is heated at 150° C. for 7 hours, subsequently cooled to 90° C. and treated with 50 parts of methanol. The red dyestuff is filtered off with suction, washed with methanol and hot water, and dried at 90° C. The yield of crude product amounts to 14.1 parts. The crude product is re-crystallised from chlorobenzene or chlorotoluene and melts at 214–215° C. On polyester fabric, for example polyethylene glycol terephthalate, the dyestuff obtained produces a clear bluish red shade of very good fastness properties.

Example 4

4 parts of 1-amino-2-bromo-4-hydroxy-anthraquinone are introduced into a melt of 30 parts of 4-methylmercapto-3-methylphenol and 3 parts of powdered potassium hydroxide. After heating at 170–175° C. for 1½ hours the reaction is completed. The reaction mixture is cooled to 100° C., treated with 200 ml. of a 25% sodium carbonate solution, then boiled for a short time, filtered off with suction while hot and carefully washed with hot water.

3.8 parts of crude dyestuff are obtained which is identical with the reaction product obtained according to Example 1.

Example 5

From 22 parts of 2-methylmercaptophenol and 4 parts of anhydrous potassium carbonate a melt is prepared into which at about 120° C. 7 parts of 1-amino-2-bromo-4-hydroxyanthraquinone are introduced. After heating at 160° C. for 5 hours the reaction is completed. Working up is carried out as indicated in Example 1. 6.2 parts of dyestuff are obtained which, after re-crystallisation from toluene, melts at 169–170° C.

Example 6

According to the method given in Example 1, 25 parts of 4-ethyl-mercapto-phenol, 4 parts of anhydrous potassium carbonate and 8 parts of 1-amino-2-bromo-4-hydroxy-anthraquinone are reacted. 8.7 parts of dyestuff are obtained which, after re-crystallisation from chlorotoluene, melts at 175°–158° C. On polyester fabric, for example polyethylene glycol terephthalate, the dyestuff yields a brilliant red shade of very good fastness properties.

Example 7

35 parts of 4-methylmercapto-2-methoxy-phenol, 4 parts of anhydrous potassium carbonate and 8 parts of 1-amino-2-bromo-4-hydroxy-anthraquinone are reacted at 150° C. as described in Example 1, and yield 8 parts of red dyestuff which, after re-crystallising from chlorotoluene, melts at 195–196° C., and produces on polyester fabric, for example polyethylene glycol terephthalate, a clear red shade of very good fastness properties.

Example 8

From 25 parts of 4-(2'-hydroxyethylmercapto)-phenol and 2.6 parts of anhydrous potassium carbonate a melt is prepared at 100° C. under a nitrogen atmosphere. After the addition of 8 parts of 1-amino-2-bromo-4-hydroxy-anthraquinone the reaction takes place at 150° C. within 2 hours. After cooling, the reaction mixture is treated with 20 parts of methanol and filtered off with suction after standing for several hours. After washing with a warm dilute sodium carbonate solution and drying at 80° C., 7.4 parts of a red dyestuff are obtained which, after re-crystallisation from chlorotoluene, melts at 189–191° C. and produces on polyester fabric, for example polyethylene glycol terephthalate, a clear red shade of very good fastness properties.

We claim:

1. A compound of the formula

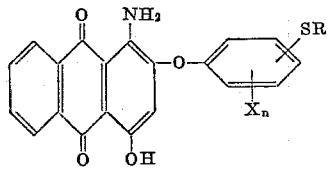

wherein R is a member selected from the group consisting of lower alkyl and hydroxy lower alkyl; X is a member selected from the group consisting of lower alkyl and lower alkoxy; and n is an integer of 0–2.

2. A compound of the formula

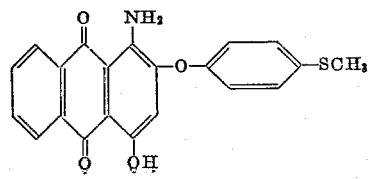

3. A compound of the formula

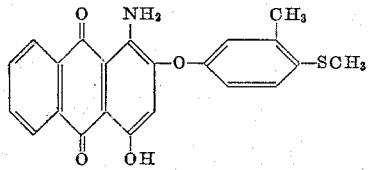

4. A compound of the formula

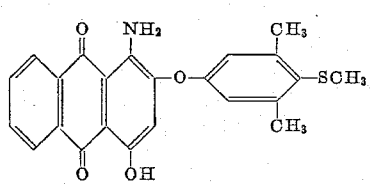

5. A compound of the formula

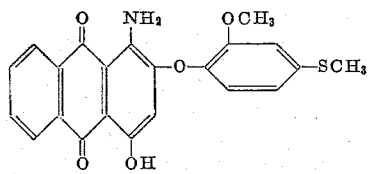

6. A compound of the formula

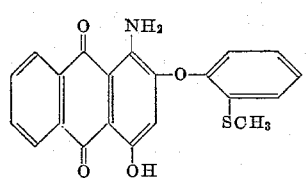

7. A compound of the formula

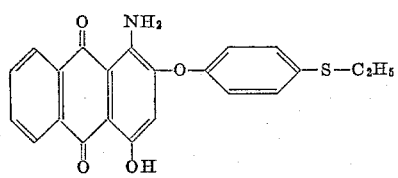

8. A compound of the formula

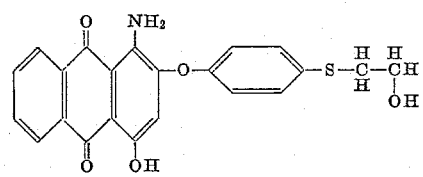

References Cited by the Examiner

UNITED STATES PATENTS 2,072,259  3/1937  Haddock et al. ____ 260—380 X

OTHER REFERENCES

German Auslegeschrift (Maier), 1,113,051, August 1961 (3 pp. spec.).

LORRAINE A. WEINBERGER, *Primary Examiner.*

H. C. WEGNER, *Assistant Examiner.*